United States Patent
Dobbins

(10) Patent No.: US 12,454,245 B1
(45) Date of Patent: Oct. 28, 2025

(54) TAMPER DETERRENT ATTACHMENT FOR EXTERNAL DOOR LOCKS ON VEHICLES

(71) Applicant: Vincent A Dobbins, Glen Burnie, MD (US)

(72) Inventor: Vincent A Dobbins, Glen Burnie, MD (US)

( * ) Notice: Subject to any disclaimer, the term of this patent is extended or adjusted under 35 U.S.C. 154(b) by 0 days.

(21) Appl. No.: 18/796,847

(22) Filed: Aug. 7, 2024

(51) Int. Cl.
| B60R 25/10 | (2013.01) |
| B60R 25/01 | (2013.01) |
| B60R 25/102 | (2013.01) |
| E05B 83/02 | (2014.01) |

(52) U.S. Cl.
CPC .......... B60R 25/1001 (2013.01); B60R 25/01 (2013.01); B60R 25/102 (2013.01); *E05B 83/02* (2013.01)

(58) Field of Classification Search
CPC ... B60R 25/1001; B60R 25/01; B60R 25/102; E05B 83/02
See application file for complete search history.

(56) References Cited

U.S. PATENT DOCUMENTS

| 5,435,609 A | * | 7/1995 | Igata | E05B 83/36 292/346 |
| 5,752,728 A | * | 5/1998 | Matouschek | E05B 45/086 292/346 |
| 6,591,641 B1 | * | 7/2003 | Cann | E05C 19/186 292/259 R |
| 6,798,339 B2 | * | 9/2004 | Thompson | G07C 9/00182 340/5.72 |
| 7,543,466 B2 | * | 6/2009 | Loughlin | E05B 67/383 70/33 |
| 8,496,276 B2 | * | 7/2013 | Kaminsky, Jr. | E06B 7/16 292/216 |
| 8,736,279 B2 | * | 5/2014 | Huang | H02H 3/16 361/42 |
| 11,794,691 B2 | * | 10/2023 | Williams | G08B 13/19647 |
| 12,033,448 B2 | * | 7/2024 | Ufkes | G06F 21/88 |
| 2004/0055345 A1 | * | 3/2004 | Moore | E05B 81/70 70/257 |
| 2008/0216524 A1 | * | 9/2008 | Abdelazeem | E05B 83/10 70/91 |
| 2023/0104420 A1 | * | 4/2023 | Morton | E05B 65/48 70/35 |
| 2024/0181821 A1 | * | 6/2024 | Glenn | B60D 1/60 |

* cited by examiner

Primary Examiner — Thomas D Alunkal
(74) Attorney, Agent, or Firm — Usha S. Koshy

(57) ABSTRACT

A tamper deterrent attachment for external door locks like a puck lock on vehicles, comprising a set of plastic accessories with molded wire conductors placed within proximity of the door brackets of a vehicle such as a truck or a van with the wire conductors of the accessories connected to the reed switches next to the door brackets and the wire conductors on the accessories also connected to a wired or wireless alarm within the vehicle. If an attempt is made to pry open the puck lock, cut the lock brackets or cut through the sheet metal around the lock to remove it, the wire conductors molded in the accessories will also be cut to trigger an alarm to notify the owner of the vehicle of the attempted break-in of the vehicle.

6 Claims, 3 Drawing Sheets

TAMPER DETERRENT ATTACHMENT FOR EXTERNAL DOOR LOCKS ON VEHICLES

FIELD OF THE INVENTION

The present invention is generally related to external door locks on vehicles. More particularly, the invention relates to a tamper deterrent attachment for external locks installed on the doors of trucks, vans and other vehicles that facilitates triggering an alarm to notify the owner(s) of the vehicle(s) when an attempt is made to pry open or cut out the external lock.

BACKGROUND OF THE INVENTION

External locks are installed on the doors of trucks and cargo vans by their owners as an added measure of security to the generic locks installed by the manufacturers of these vehicles, in an effort to eliminate break-ins into the vehicles and the theft of stored articles within the cargo hold of the vehicles. Most such installed external locks require a key to unlock and remove them to access the cargo hold of the vehicles. The most popular among these currently used such external locks is one called the "puck lock" which has a casing to cover the aligned brackets on the door/doors of the truck or van through which a bolt is inserted to lock the door/doors with a key. However, since these puck locks generally do not have any alarm systems incorporated into them, they can be pried open by a criminal with specific tools capable of cutting the metal behind these locks and removing the locks to easily access the vehicle's cargo hold and steal its contents.

When a puck lock is mounted between one or two doors of a truck, van, or other vehicle to lock those doors, the magnets under the puck lock are in close proximity to the reed switches next to the door brackets holding the bolt of the lock. The magnetic field created when the magnets under the puck lock are in proximity to the reed switches, results in the reed switch contacts closing to form a continuous closed circuit. When the puck lock is opened with an owner's key, and the lock is removed, the circuit is opened to open the doors to the vehicle. If, a thief pries open the puck lock, or cuts open the lock bracket using tools readily available and the lock is removed, the closed circuit formed by the magnet and the reed switch is compromised and the circuit opens for access to the vehicle's interior.

The present invention is an accessory that when incorporated into the external door locks including puck locks used to secure the doors of trucks and vans, facilitates triggering an alarm to alert the owner(s) of the vehicle(s) when a thief tries to pry open and/or cut through these external lock(s) including the supporting lock brackets.

The following summary of the present invention will provide the concise embodiment and scope of the present invention to solve the current vexing problem of break-ins of vehicles equipped with external door locks.

SUMMARY OF THE INVENTION

The present invention is a low-cost accessory which when placed strategically within a standard puck lock or other such external lock system used on the doors of a truck or other vehicle, sets off an alarm when a thief tries to pry open and/or cut through the supporting brackets of the lock and removes the external lock of the vehicle.

It is an object of the present invention to provide an early warning system and method to deter the break-ins of trucks, vans and other vehicles secured with external door locks, by incorporating an accessory to these external locks that triggers installed built in wired or wireless alarm systems within the vehicles when these locks are tampered with and/or attempts are made to remove the locks by cutting through them.

The exemplary embodiment of the invention comprises, a set of plastic accessories/inserts attached one on each side of the two brackets that hold the bolt of the external lock system installed on the doors of a truck, van, or, other vehicle. In this embodiment of the invention, a wire conductor is molded inside the plastic inserts surrounding the closest edges of the plastic inserts. Further in this embodiment, the wire conductor is connected to the two reed switches next to the brackets. When the puck lock is placed over the door brackets, the magnets under the puck lock come in proximity to the reed switches and also the wire conductor inside the plastic inserts of the invention, to form a closed circuit. In this embodiment of the invention, the circuit in the wire conductor attached to the plastic accessories is connected to an existing alarm system within the vehicle which will be set off when the closed circuit is opened if the lock is pried open or attempts are made to cut the door lock brackets, or cut around the lock though the sheet metal of the door to remove the lock by a thief. The circuit would also be opened to sound the alarm, notify an alternate device, or trigger a secondary locking device if an attempt is made to cut under the lock which would cut the plastic accessories/inserts and in turn the wire conductor causing an open circuit. Alternately, the accessories of the invention with the wire conductor can be attached to a wireless transmitter inside the vehicle which is attached to the interior side of the sheet metal of the doors. In this scenario, if an attempt is made to remove the lock by cutting around the sheet metal of the doors to remove the entire lock, cutting the sheet metal will also cut the wire conductor inside the accessories of the invention, and the circuit would be opened triggering the wireless transmitter to sound the alarm to trigger a secondary locking system, or be transmitted to the owner's handheld wireless device. This early detection means to alert the owner of the vehicle when the lock is tampered with can be incorporated into an existing alarm system within the vehicle, an added alarm, or a secondary lock such as a magnetic lock.

The foregoing summary of the present invention and its embodiments should not be construed to limit the scope of the invention. In this summary of the invention and in the specification in general references to the embodiments of the invention as, "the exemplary embodiment," and all such related references to embodiments of the invention do not necessarily refer to the same embodiment(s). Rather, these references to the various embodiments in general mean that a particular feature, structure, or characteristic described in conjunction with an embodiment is included in at least some embodiments, but not necessarily all embodiments of the invention. The objects, embodiments, and features of the present invention as described in this summary of the invention will be further appreciated and will become obvious to one skilled in the art when viewed in conjunction with the accompanying drawings, detailed description of the invention, and the appended claims.

DETAILED DESCRIPTION OF THE INVENTION

The present invention is a set of plastic accessories/inserts placed one on each side of the brackets that align and hold the two doors of a truck or van to enable locking the doors using a puck lock. A wire conductor molded into these plastic accessories/inserts and connected to the reed switches on either side of the brackets form a closed circuit when the magnets under the puck lock come in proximity and in contact with them. If the wire conductor thus molded into the plastic accessories/inserts are cut by a foreign tool or the lock pried open, the circuit opens and sounds an alarm that is transmitted either through a wired or wireless system to the owner of the vehicle.

Figure 1:
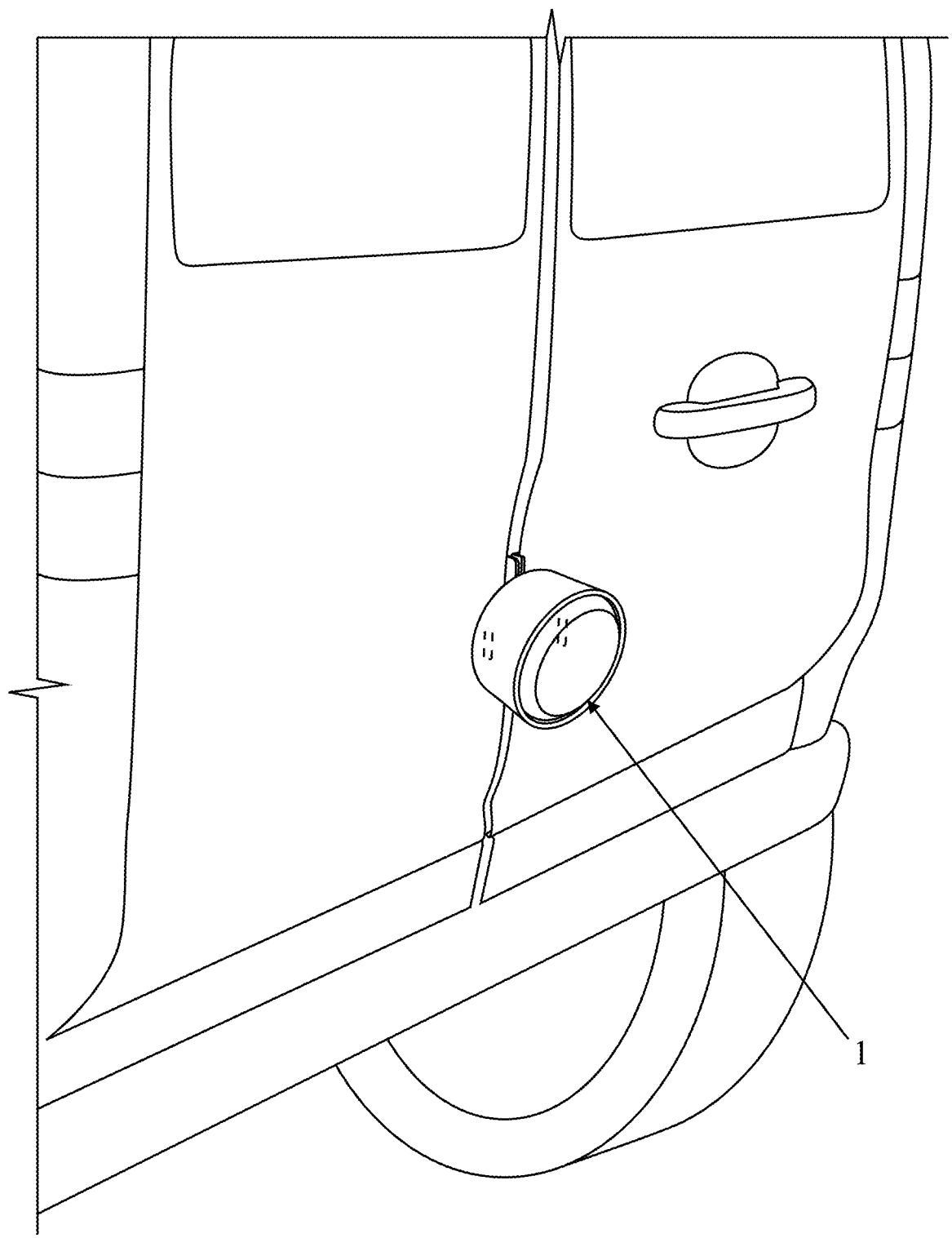
FIG. 1 is a perspective view of an external puck lock attached between the two back doors of a vehicle.

Referring now to the Figures wherein like numerals represent like elements in the various views presented, and referring in particular to FIG. 1 which shows a perspective view of a standard puck lock 1 installed between the two back doors of a van to lock the doors to prevent theft of the contents stored in the cargo hold of the van.

Figure 2:
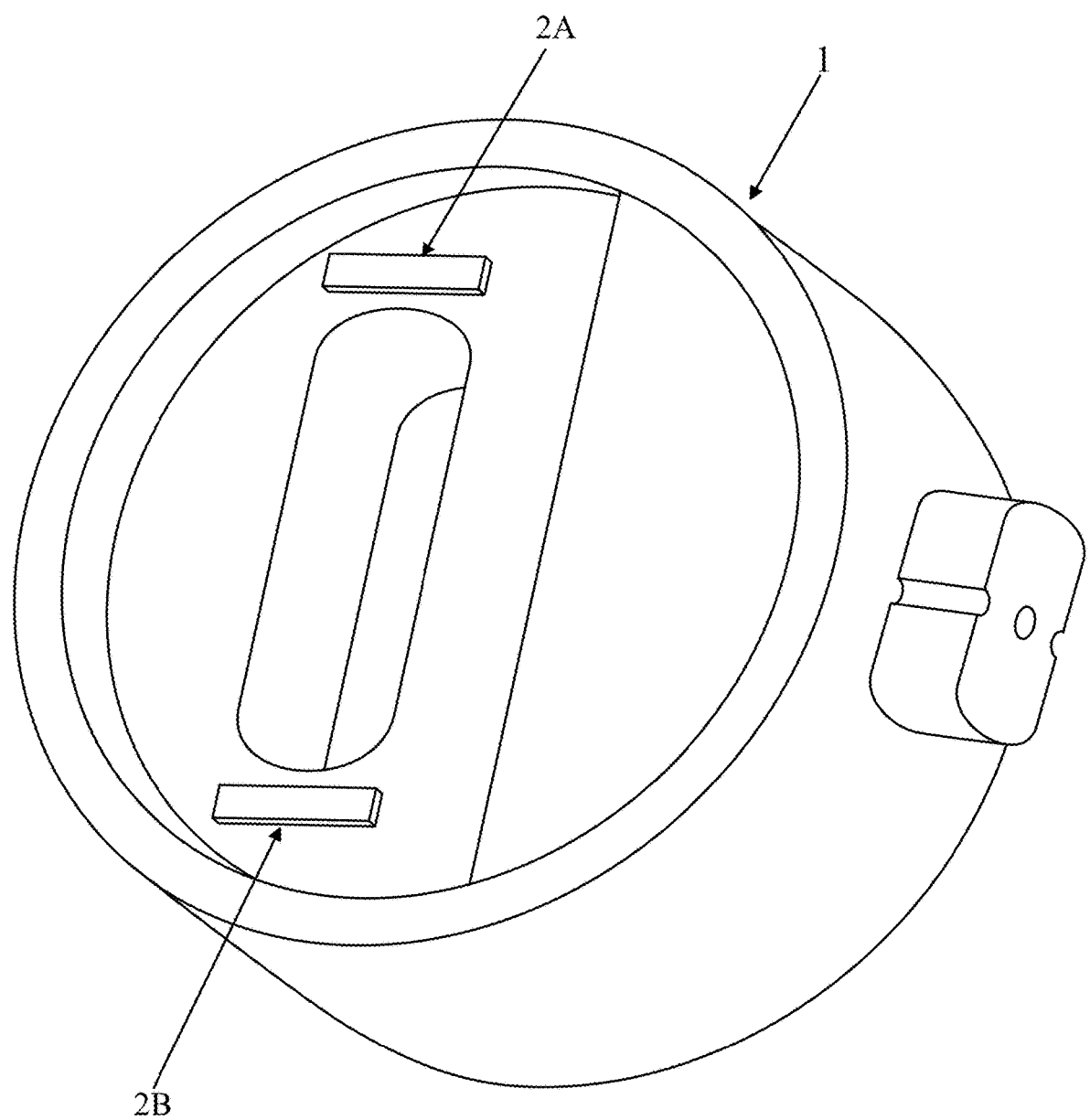
FIG. 2 is a perspective view of the magnets on the backside of a standard puck lock that will come within proximity of the reed switches near the lock brackets to form a closed circuit to lock the doors of the vehicle.

FIG. 2 is a perspective view of the back side of the puck lock 1 showing the magnets 2A and 2B which will come within proximity of the reed switches next to the brackets on the doors when the puck lock is placed over the brackets to create a closed circuit to lock the door of the vehicle.

Figure 3:
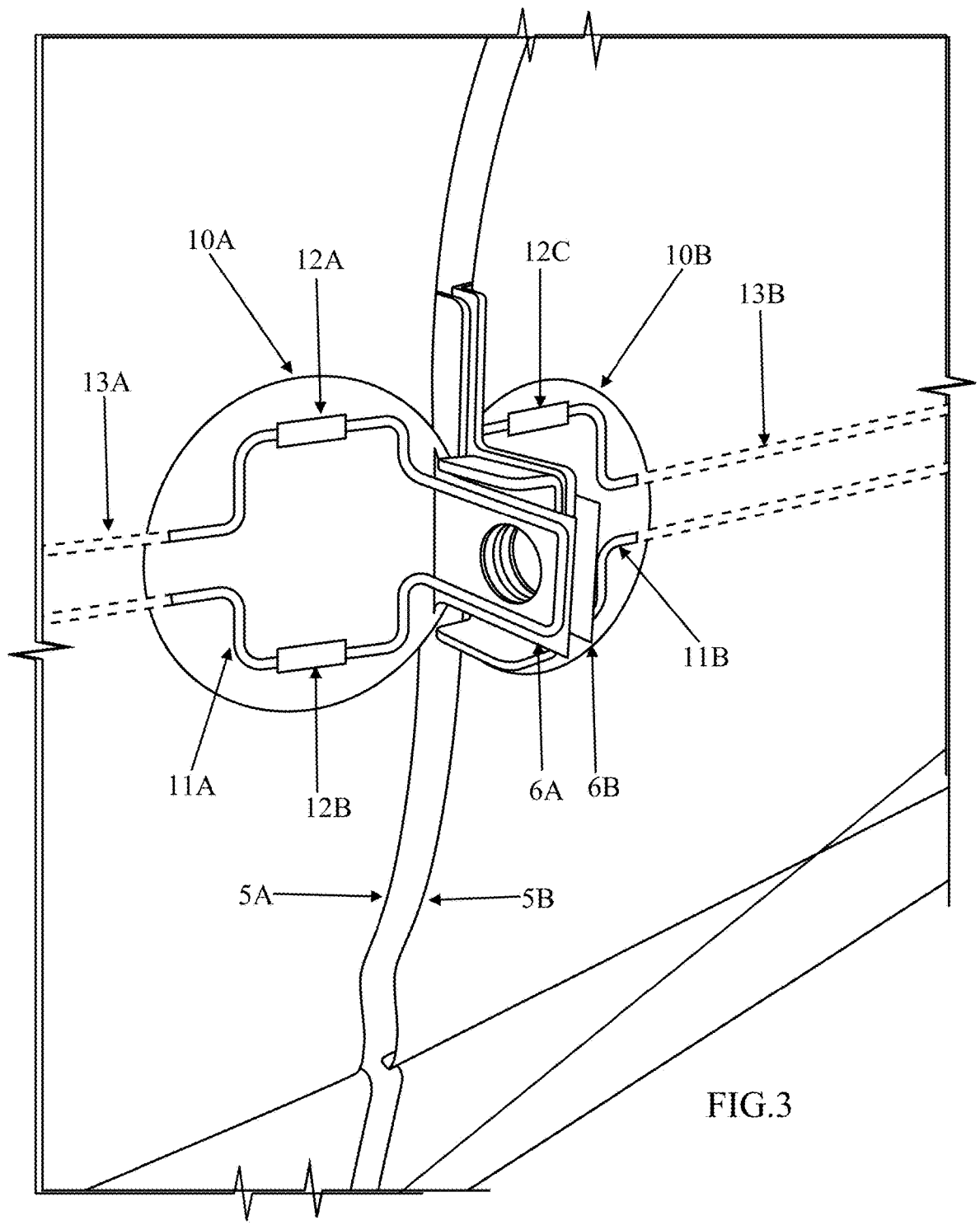
FIG. 3 is a perspective view of the accessory of the present invention configured one on each side of the brackets under the reed switches.

FIG. 3 is a perspective view of the accessory/inserts 10A and 10B of the present invention placed one on each side of the brackets 6A and 6B of the vehicle doors 5A and 5B under the reed switches. 11A and 11B. When the puck lock is placed over the brackets 6A and 6B the magnets under the puck lock align and come within proximity of the reed switch contacts 12A, 12B, 12 C and 12D (hidden in this view) of the reed switches 11A and 11B and also in contact with the wire conductors molded inside the closest edges of the plastic accessories/inserts 10A and 10B (wire conductors not shown in this view) to form a closed circuit to lock the doors of the vehicle. The broken lines in the sets of 13A and 13B depict the closed-circuit wiring formed when the magnets on the underside of the puck lock come within proximity of the reed switch contacts of 12A, 12B, 12C and 12D. In this embodiment of the invention, the circuit in the wire conductors attached to the plastic accessories 10A and 10B is connected to an existing alarm system within the vehicle which will be set off when the closed circuit is opened if the lock is pried open or attempts are made to cut the door lock brackets 6A and 6B, or cut around the lock though the sheet metal of the door to remove the lock by a thief. Alternately, the accessories 10A and 10B of the invention with the wire conductors can be attached to a wireless transmitter inside the vehicle which is in turn attached to the interior side of the sheet metal of the doors 5A and 5B. In this scenario, if an attempt is made to remove the lock by cutting around the sheet metal of the doors 5A and 5B to remove the entire lock, cutting the sheet metal will also cut the wire conductors inside the accessories 10A and 10B of the invention, and the circuit would be opened triggering the wireless transmitter to sound the alarm to trigger a secondary locking system, or be transmitted to the owner's handheld wireless device. This early detection means to alert the owner of the vehicle when the lock is tampered with can be incorporated into an existing alarm system within the vehicle, an added alarm, or a secondary lock such as a magnetic lock.

While the present invention of a tamper deterrent accessory/insert has thus been described with respect to a specific embodiment, it is not limited in scope to that embodiment, rather, many modifications, variations, alterations, substitutions, and equivalents of the described embodiment will be apparent to those skilled in the art.

What is claimed is:

1. A tamper deterrent attachment for external door locks on vehicles comprising:
    a set of plastic accessories placed one on either side of a set of brackets on said vehicles doors;
    said set of plastic accessories attached under a set of reed switches installed on said brackets of said vehicles doors;
    said reed switches having reed switch contacts;
    said reed switch contacts in proximity with a set of magnets on said external door locks on said vehicles to form a closed circuit to lock said doors of said vehicles;
    said plastic accessories having wire conductors molded into said plastic accessories;
    said wire conductors molded into said plastic accessories in contact with said reed switch contacts;
    said wire conductors molded into said plastic accessories in contact with said magnets on said external door locks; and
    said wire conductors on said plastic accessories connected to an alarm system inside said vehicles to set off an alarm when said brackets of said external door locks are cut.

2. The tamper deterrent attachment for external door locks on vehicles described in claim 1 wherein the external door lock is a puck lock having a set of magnets on its underside that contact the reed switch contacts to form a closed circuit to lock the doors of the vehicle.

3. The tamper deterrent attachment for external door locks on vehicles described in claim 1 wherein the wire conductors attached to the plastic accessories is connected to a secondary door lock within the vehicle which will be triggered to re-lock the door of the vehicle when the wire conductors are cut along with the brackets of the external door lock.

4. The tamper deterrent attachment for external door locks on vehicles described in claim 1 wherein the wire conductors molded into the plastic accessories are connected to a wireless transmitter for an alarm inside the vehicle which is triggered and the alarm conveyed to the owner of the vehicle through a wireless device when the brackets are cut open.

5. The tamper deterrent attachment for external door locks on vehicles described in claim 4 wherein, the wire conductors molded into the plastic accessories and connected to a wireless transmitter for an alarm inside the vehicle are attached to the interior side of the sheet metal of the doors of the vehicles.

6. The tamper deterrent attachment for external door locks on vehicles described in claim 5 wherein, cutting around the sheet metal of the vehicle doors will also cut the wire conductors inside the plastic accessories to open the closed circuit, triggering the wireless transmitter to sound the alarm.

* * * * *